United States Patent Office 2,766,478
Patented Oct. 16, 1956

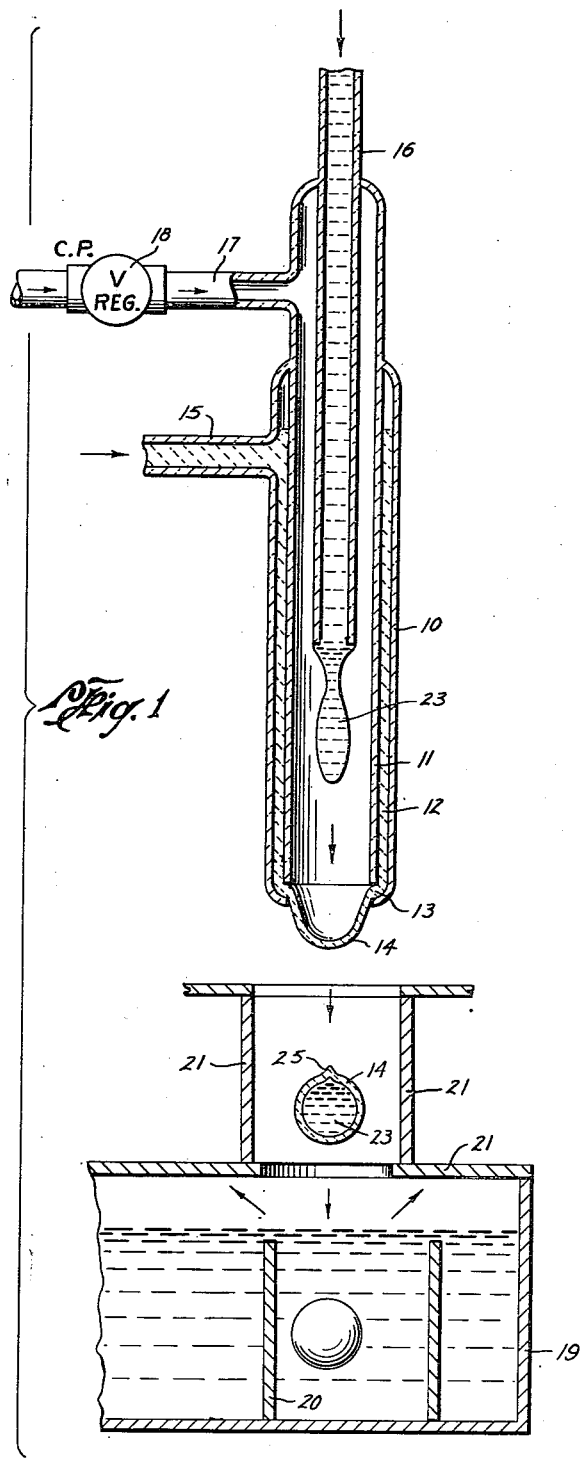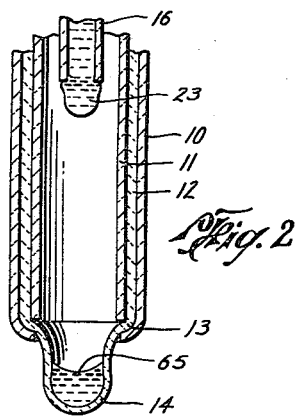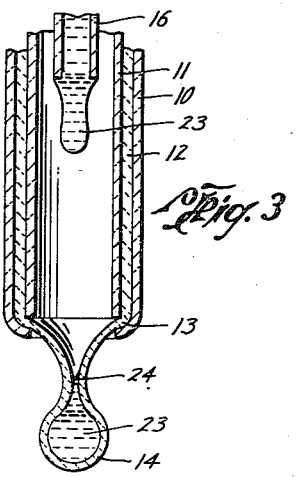
Charles F. Raley, Jr.
William J. Burkett, Jr.
Judson S. Swearingen
INVENTOR.

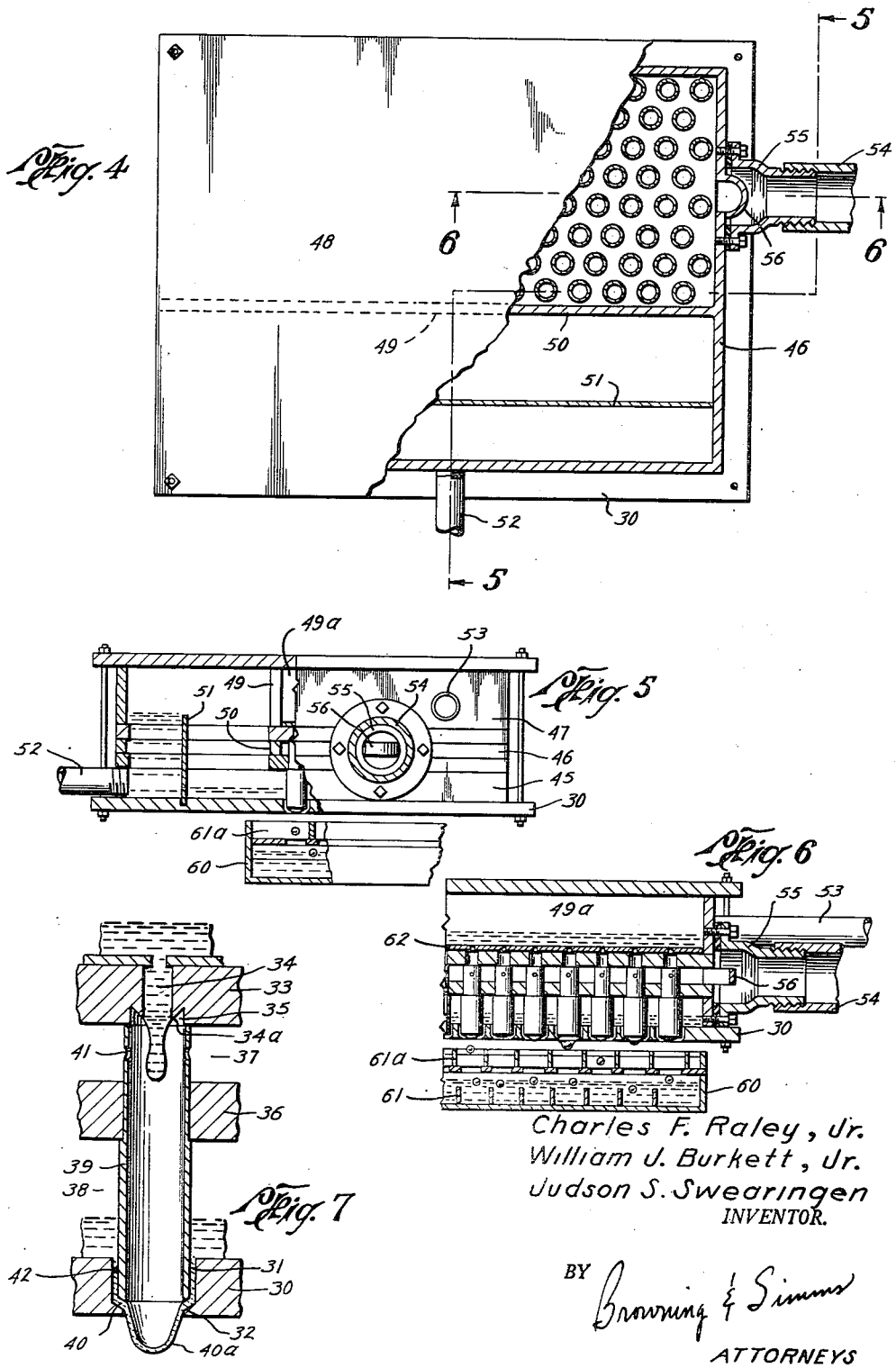

2,766,478

ENCAPSULATING METHOD AND APPARATUS

Charles F. Raley, Jr., William J. Burkett, Jr., and Judson S. Swearingen, San Antonio, Tex., assignors to Gasoline Research, Industrial and Commercial Company (Garico), Inc., a corporation of Panama Application October 15, 1951, Serial No. 251,321

20 Claims. (Cl. 18—1)

This invention relates to a method and an apparatus for encapsulating a material in an encapsulating medium. In another of its aspects, it relates to a method and apparatus for encapsulating a viscous liquid in an encapsulating medium to form substantially spherical capsules thereof. In still another of its aspects, it relates to a method for encapsulating a material which is at least partially miscible with a liquid encapsulating medium without permitting substantial intermixing thereof. In yet another of its aspects, this invention relates to apparatus for forming a capsule of an insoluble alginic acid derivative which can be plasticized, if desired, with a plasticizer and to a method therefor. In another of its aspects, it relates to a method of making a product comprising a pellet containing liquid in an inner cellular structure, there being an outer capsule integral with the cell walls. In still yet another of its aspects, this invention relates to an encapsulated petroleum oil emulsion and to a method of making the same. In even another of its aspects, this invention relates to a method for preventing gaseous inclusions from occurring in an encapsulating medium. In even yet another of its aspects, this invention relates to a method for decreasing the tendency of capsules of a liquid to inflate.

It is often desired to enclose a material, either a liquid or solid, in an encapsulating medium in order to facilitate handling of such material and to protect it from contamination through handling and from various atmospheric conditions. In many instances, it is necessary to encapsulate a material in mass quantities to produce many thousands of individual capsules thereof. Many of the encapsulating processes that are now in use, particularly those for encapsulating liquids, either freeze the liquid and dip the resulting product in a solution of a capsule-forming medium, or mold a capsule in halves and cement or weld these halves together after filling them with the liquid. Also, some of these processes mold the capsules into their finished form and then fill them by employing an inoculating needle through which the liquid to be encapsulated is injected into the capsule.

More recently there has been developed an apparatus for producing encapsulated liquids on a mass scale wherein a liquefied encapsulating medium is discharged from an annular orifice in the form of a cylinder which, due to the surface tension of the encapsulating medium, forms into a spherical shape on its bottom side. The liquid to be encapsulated is continuously injected directly into the thus formed cylinder from a point internally of and adjacently to the orifice. The resulting filled cylinder then drops from the orifice and forms a capsule around the injected liquid. One disadvantage of such type of apparatus is that the material to be encapsulated must be a liquid. Another disadvantage is that such liquid must have a low viscosity in order for the apparatus to produce satisfactory results. Thus, should an attempt be made to encapsulate a viscous liquid, the surface tension thereof would be insufficient to pull the individual capsule portions into a spherical shape and irregularities thereof could even extend through the wall of the capsule thereby resulting in an imperfect capsule wall.

An object of this invention is to provide a simple encapsulating process and apparatus adapted to produce capsules of liquids or solids on a mass scale.

Another object of this invention is to provide a process and apparatus for encapsulating a material by impinging such material onto a film of encapsulating medium.

Another object of this invention is to provide a process and apparatus particularly adapted to encapsulate a viscous material or one not having sufficient surface tension to pull a free falling body thereof quickly into a spherical shape, the process and apparatus being further adapted to form substantially spherical capsules containing such material by causing an individual portion of such material to impinge on a film of encapsulating medium in such a manner that the resulting force of impingement shapes the material and capsule into a more nearly spherical shape.

Still another object of this invention is to provide an apparatus for encapsulating a material wherein the capsules of material are dropped into a hardening bath and any droplets of such bath which are splashed upwardly by the capsules are prevented from striking other capsules being formed by causing the upward path of travel of the droplets to have a lateral component sufficient to avoid striking such newly forming capsules.

Yet another object of this invention is to provide an encapsulating medium and a capsule formed therefrom comprising a water-soluble alginic acid derivative capable of being hardened to the resulting capsule form by reaction with an insolubilizing reagent.

Even yet another object is to provide a process for plasticizing such a hardened capsule to render it more flexible and less likely to rupture.

Still yet another object of this invention is to provide a process for preparing an encapsulating medium in such a manner than any gaseous inclusions in the resulting medium are avoided.

An even further object of this invention is to provide a method for encapsulating a material in a liquid encapsulating medium in which said material is at least partially miscible without permitting any substantial intermixing of the two.

A still further object of this invention is to provide a method, and the product thereof, for encapsulating an emulsion in an encapsulating medium.

Another object of this invention is to provide a method for drawing in the tail of a capsule formed by the apparatus of this invention without necessitating the provision of sufficient free falling distance for said capsule during its formative stage to permit surface tension to draw said tail in and remove it as a projection from said capsule.

Yet another object of this invention is to provide a method for decreasing the tendency of a capsule of material to inflate.

Other objects, advantages and features of this invention will be apparent to one skilled in the art upon considering the written specification, the appended claims and the attached drawings.

It has now been found that a material can be encapsulated by impinging discrete portions of it onto a supported film of encapsulating medium. The film is preferably supported from an orifice through which the encapsulating medium continuously flows and has a slight pneumatic pressure applied thereto on the same side as the material impinges so that after such impingement, the material to be encapsulated is supported by the film until the force of gravity, aided by the pneumatic pressure, causes the entire mass of material and film to fall downwardly in such a manner that the film will neck down over the material and part at such neck from the encapsulating medium thereafter flowing from the orifice thereby not only enclosing the material in a continuous wall of encapsulating medium but also forming a new film across the orifice in a position to receive the next portion of material to be encapsulated. It has now been found that even though the film across the orifice should be accidentally ruptured, a new one will be automatically formed without stopping the flow of material to be encapsulated.

It has also been found that by impinging the material to be encapsulated upon the encapsulating film, the former can be quite viscous and yet be formed readily into substantially spherical capsules. Although such material, as it is discharged from its container, will assume an elongated shape due to its viscous or jelly-like nature, the force of the impact on the film will cause it to become more spherical in shape even before it is completely surrounded by the encapsulating medium.

Also it has been found that although the capsules formed in this manner are not perfectly spherical in shape and possess a short tail at the point where they disengage from the orifice, the capsules assume substantially a spherical shape when dropped into a hardening bath having a rapid hardening action even though they have fallen only a very short distance, say two inches. The bath apparently tends to harden the outer layer of the encapsulating medium very quickly so that the resulting tension draws the capsules into a substantially spherical shape.

Further, it has been found that when the capsules drop into the hardening bath, droplets of the latter tend to splash upwardly onto the new film of encapsulating medium formed across an orifice and to harden it in that position thereby preventing it from functioning in its intended fashion. According to one feature of this invention, such splashing can be rendered harmless by providing a vertical baffle in the hardening bath adjacent the point where the capsules fall into the bath. The upward path of the droplets will then have a lateral component. A second baffle or checkerwork can be provided above the bath against which the droplets impinge and fall back harmlessly into the bath.

Even further, it has been found that a very satisfactory encapsulating medium can be an aqueous solution of a water-soluble alginic acid derivative. Such solution can be quite viscous in proper concentrations and will readily form the desired film across the orifice. The capsule formed from such medium can be hardened by reacting the alginic component with a reagent which renders it water-insoluble. The flexibility of a capsule hardened in such manner can be increased by plasticizing it with glycerin. Such water solutions of capsule-forming material are particularly adapted to encapsulate oil-in-water emulsions. In so doing, the meniscus of the portion of emulsion impinged upon the encapsulating film will be continuous with the inside surface of the neck of the capsule wall as it disengages from the capsule-forming apparatus thereby ensuring that all of the individual portion of the emulsion will be contained in that particular capsule and none will be left behind in the newly formed film.

Even yet further, it has been found that a material which is at least partially miscible with the liquid encapsulating medium can be encapsulated therein without substantial intermixing of the two by incorporating in the material to be encapsulated a reagent capable of reacting with the encapsulating medium to immediately form a membrane between the material and the medium after they have been brought into contact. In this manner, even an aqueous material can be encapsulated with an aqueous encapsulating medium without substantial intermixing of the two.

When preparing the encapsulating medium, a porous solid is usually dissolved in a solvent liquid. Such solid will contain air or other gas in its pores which will form gaseous inclusions in the resulting solution inasmuch as the latter is viscous and no opportunity is afforded to permit the gas to escape. It has been found that these gaseous inclusions can be prevented by displacing such gas from the porous solid prior to its solution, with a second gas which is soluble in the solvent liquid along with the porous solid. Hence, no gaseous inclusions can occur in the resulting encapsulating medium to cause thin spots or weak areas in a capsule wall.

The apparatus of this invention is illustrated in the attached drawings and represents exemplary forms of apparatus with which the process of this invention can be practiced to produce the products thereof. In the drawings, where like characters of reference designate like parts throughout the several views:

Fig. 1 represents one embodiment of the apparatus of this invention and illustrates the method thereof;

Figs. 2 and 3 illustrate various stages in the formation of capsules made in accordance with this invention;

Fig. 4 is a plan view of a preferred embodiment of this invention for encapsulating a material on a mass scale;

Fig. 5 is a cross-sectional view taken along the line 5—5 of Fig. 4;

Fig. 6 is a cross-sectional view taken on the line 6—6 of Fig. 4; and

Fig. 7 is an enlarged cross-sectional view of one of the elements comprising Fig. 4.

Referring now to Fig. 1, there is illustrated a form of apparatus adapted to encapsulate a material according to the method of this invention. In the encapsulating apparatus, an outer conduit 10 is situated concentrically with an inner conduit 11 in such a manner as to form an annular passageway 12 adapted to conduct a liquid encapsulating medium therethrough and to discharge the same from an annular orifice 13 formed between the lower end of conduit 11 and the inwardly curved or lipped end of conduit 10. The orifice 13 is so constructed and arranged, as will be more fully described hereinafter, that the encapsulating medium will form a film 14 thereacross. An encapsulating medium inlet conduit 15 is provided to introduce such medium into the annular space 12. Extending interiorly and concentrically of conduit 11 is discharge means for the material to be encapsulated which can be an inner conduit 16 terminating at a point above annular orifice 13. The distance between the discharge end of conduit 16 and the plane of the orifice 13 should be sufficient to permit the material to be encapsulated to be discharged from conduit 16 in discrete portions which can then fall freely for the remainder of such distance to gain sufficient momentum that upon impingement with the film 14, the portions of material will be shaped into a more nearly spherical shape as described below. A means for supplying a pneumatic pressure to the surface of film 14 can be a conduit 17 which opens into the inner portion of conduit 11 and contains in its length an orifice, such as gas regulating valve 18 adapted to limit the flow of gas therethrough in the event film 14 should break. This is necessary because film 14 cannot reform if gas flow is high.

Situated beneath annular orifice 13 is a vessel 19 adapted to contain a hardening fluid or bath for the encapsulating medium of the filled capsules dropped from the capsule-forming apparatus. As the filled capsules drop into the bath, they tend to splash droplets of the bath upwardly and these droplets are prone to contact film 14 so as to harden it in place on orifice 13 with resultant obvious difficulties. To prevent this, a vertical baffle 20 is disposed in vessel 19 immediately laterally adjacent of the point where the filled capsule falls into the bath. Splashed droplets then fly upwardly along a path having a lateral component and strike vertical baffles 21 between which the filled capsules can fall.

In operation, the encapsulating medium is introduced through conduit 15 into annular space 12 to discharge therefrom to form a bubble or film 14 suspended at its peripheral edges across orifice 13. The material to be encapsulated is introduced through conduit 16 and is discharged from the lower end thereof in discrete portions which fall and impinge on film 14.

In one embodiment, the material to be encapsulated is of a viscous or plastic nature and will accordingly fall from the discharge end of conduit 16 in discrete portions as a discontinuous string or elongated drop 23. Such portion is formed into a spherical capsule of material in the manner shown in Figs. 2 and 3. In Fig. 2, the material to be encapsulated is shown as it begins to form an individual portion from the parent mass in conduit 16. This portion lengthens as in Fig. 3 and finally necks down as in Fig. 1 until it falls from the discharge end of conduit 16. According to this embodiment, the viscosity of the material to be encapsulated is too great for the surface tension to quickly pull this distorted elongated portion 23 into spherical shape. However, when it falls an inch or two and impinges on film 14, the impact shapes it more nearly into a spherical mass as shown in Fig. 2. The weight of the mass of the capsule and the material to be encapsulated is great enough to draw the film 14 downwardly, as shown in Fig. 3, so that it necks down at 24 and falls.

When the walls of such neck are finally pulled together during the fall of the filled capsule, the material is completely surrounded by the encapsulating medium and, at the same time, a new continuous film is formed across the orifice ready to receive the next portion of material to be encapsulated. As the filled capsule falls without support into the hardening bath, surface tension pulls the capsule into an almost spherical shape with only a tail 25 on it, as shown in Fig. 1. Numerous methods could be employed to allow time for the surface tension to draw this tail completely in to form a more nearly perfect spherical capsule. In accordance with one feature of this invention, it is preferred to simply allow the capsule to fall directly into the hardening bath. The hardening bath reacts first with the outermost portion of the wall of encapsulating medium so that as this portion tends to become hardened, it shrinks thereby pulling the capsule into a substantially spherical shape. The tensioning of the outer skin of the capsule occurs while the latter has sufficient pliability so that any irregularities in its surface, such as tail 25, are smoothed by the resultant stress which tends to compress the capsule into a configuration having a minimum volume, i. e., a sphere. The capsule then becomes hardened throughout and will retain such shape.

Referring again to Fig. 1, the film 14 is preferably kept in a more or less extended condition by the application of a gaseous or pneumatic pressure to its upper or internal side. The amount of pneumatic pressure applied to the film will depend upon a number of factors including the strength of the film, its viscosity and area. However, it has been found to be ordinarily satisfactory to apply a pressure sufficient to cause the film 14 to be distended somewhat (as illustrated in Fig. 1) to form a sac or pocket for receiving the portion of material to be encapsulated and yet insufficient to cause film 14 to become disrupted by such pressure before the material to be encapsulated is impinged thereon. When using an encapsulating medium having the properties of a solution of sodium alginate dissolved in water, it has been found that a pressure within the range of .09 to .12 inch of water is satisfactory when applied to apparatus such as that illustrated in Fig. 1. In some instances, the size of the pellet of material to be encapsulated does not have sufficient weight to cause the filled capsule to become disengaged from the orifice in the manner indicated in Fig. 3. The application of pneumatic pressure to the upperside of film 14 assists the weight of the material to be encapsulated in pulling the filled capsule off as in Fig. 3. Thus, when employing a pneumatic pressure in this manner, it should be of sufficient magnitude to not only maintain the film in a somewhat distended condition but also to aid the mass of the material to be encapsulated to pull the resulting filled capsule from the capsule-forming apparatus. However, the pressure should not be so great that the film 14 will break under its force, nor so small that even with the aid of the weight of the material to be encapsulated, the capsule will not form and fall. If the rate of flow of the gaseous medium through the conduit 17 is sufficiently great, it will interfere with the reformation of the film 14 should the latter break. To prevent such interference, an orifice such as control valve 18 is employed to restrict the rate at which the gas flows to such a value that film formation is not prevented. This restriction has been found to be of the order which is equivalent to that of a .16″ diameter orifice or even less.

The size of the individual portions of the material to be encapsulated can be controlled by varying the internal diameter of the discharge end of conduit 16 or the rate of flow of the material to be encapsulated. A small diameter discharge end of conduit 16 will cause the size of the portions of material to be encapsulated to be correspondingly small. On the other hand, by lowering the rate of flow of the material to be encapsulated, there will be provided sufficient time for a smaller mass to pull itself free from the lower end of conduit 16 and, therefore, smaller sized capsules will be produced.

The size of the opening forming orifice 13 and the internal diameter of such annular orifice are determined by factors which are related to the forces which act to reform film 14 should it become accidentally broken and completely removed from its position across the lower end of conduit 11. The internal diameter of annular orifice 13 is related to the rate at which the encapsulating medium can be discharged therefrom to successfully form and maintain film 14 thereacross. The annular orifice 13 should be sufficiently narrow to assure even distribution of the encapsulating medium in spite of opposing surface tension forces. Further, such dimensions are to a certain extent dependent upon the properties of the encapsulating medium, particularly its viscosity and surface tension. The dimensions of the nozzle should be such that the viscosity and surface tension together will assure a quick reformation of the film should it break. The dimensions to be employed under any given set of circumstances can be readily determined by mere routine test.

The thickness of the capsule wall is determined by the rate of flow of the encapsulating medium from the annular discharge orifice 13 with the limitation that such rate of flow should be great enough to insure that the film 14 will be constantly reformed across the discharge opening.

Referring now to Figs. 4 to 7 inclusive, there is shown an apparatus which is particularly adapted to encapsulate a material on a mass scale. This apparatus is arranged as a pile of assemblies which stack one upon the other in such a manner as to be easily disassembled for cleaning, inspection and repair. As shown in the drawings, a first or lower plate 30 is provided with a plurality of openings 31 which inwardly converge at their lower end to form a shoulder 32. An upper or second plate 33 is provided with a plurality of openings 34 therein which are coaxial with openings 31 but of a smaller cross-sectional area. It is through openings 34 that the material to be encapsulated flows to be discharged therefrom in discrete portions. The lower edge of plate 33 is preferably counterbored, as at 35, to provide a short lip or terminus 34a which is the discharge end of opening 34, as shown more particularly in Fig. 7, in order to more effectively form the individual portions of material to be encapsulated. A third or intermediate plate 36 can be provided to form passageways 37 and 38 between such plate and plates 33 and 30 respectively. The encapsulating medium flows on top of plate 30 and in passageway 38 in such a manner that a level thereof is maintained above openings 31. Passageway 37 is employed to conduct gas under pressure to the films formed as will be described below. Depending from plate 33 around opening 34 and discharge lip 34a is a tube or conduit 39 receivable in opening 31 in plate 30 to form an annular discharge orifice 40 with the lower inwardly converging portion of the wall of opening 31. The lower end of conduit 39 is piloted into opening 31 by three protrusions or knobs 42 spaced around its periphery and adapted to bear against the walls of said opening. The size of orifice 40 and its arrangement and function in forming film 40a is similar to that described with respect to the annular orifice 13, shown in Fig. 1.

Means are provided for maintaining a pneumatic pressure on film 40a. As stated, gas under pressure passes into passageway 37 and flows through opening 41 drilled through the wall of conduit 39 at a point between plates 33 and 36 in order to permit the passage of the gas into the interior of conduit 39.

Means are provided in conjunction with plates 30, 33, and 36 to form a closed vessel. Thus, a spacing ring or bar 45 is situated to space apart plates 30 and 36 the desired distance, and to form a fluid-tight enclosure therewith. In the same manner, spacing bars 46 and 47 space plate 33 from plate 36 and the lid 48 from plate 33. As will be noted in Fig. 5, a portion of plates 36 and 33 are cut away at one end of the capsule-forming apparatus and interior spacer partitions 49 and 50 are inserted at the edges of these cut-away portions. In this manner, a receiving vessel 49a is provided for the material to be encapsulated and passageway 37 is enclosed so that gas under pressure can be maintained therein. Disposed within the cut-out portion of plates 33 and 36 is a baffle 51 extending across the capsule forming apparatus in such a manner that the encapsulating medium introduced through conduit 52 will flow thereover and be evenly distributed across the width of the passageway 38. The material to be encapsulated can be introduced through conduit 53 into receiving vessel 49a. The pneumatic medium, such as air, to be introduced into passageway 37 can pass through a conduit 54, flanged connection 55, and thence around portion 56 of spacing bar 46 into said passageway.

Disposed beneath the capsule forming apparatus is a vessel 60 adapted to contain a liquid and having vertical baffles 61 spaced thereacross so as to provide one baffle immediately laterally adjacent each of the points where capsules fall into the bath. Splashed droplets of hardening fluid then fly upwardly along a path having a lateral component to strike vertical baffles 61a which can be spaced above the bath to afford an impingement surface for such droplets to thereby prevent their contacting any of the films 40a on the capsule forming apparatus. The capsules can float in the hardening bath and can be removed therefrom to be washed free from excess hardening fluid and to receive any further desired treatment.

As has been stated, the size of the pellets or capsules will be largely determined by the rate of flow of the material to be encapsulated through the discharge means therefor, such as opening 34 and lip 34a. To control such rate of flow, a mat 62 having a plurality of openings therein so spaced and arranged that such openings are coaxial with the openings 34 can be placed on top of plate 33 in order to limit the rate of flow of the material to be encapsulated through opening 34. Alternatively, it is contemplated that other means, such as a porous cloth, can be used to control the rate of flow of the material to be encapsulated.

The operation of the apparatus shown in Figs. 4 to 7 is similar in nature to that shown in Figs. 1 to 3. Thus, the encapsulating medium is introduced through conduit 52 and flows over baffle 51 into passageway 38 to be discharged through annular orifices 40. In so discharging, the encapsulating medium forms films 40a which are slightly distended by pneumatic pressure exerted by the pneumatic medium introduced through conduit 54, passageway 37, openings 41 and thence into the inner portion of conduits 39. The material to be encapsulated is introduced through conduit 53 and flows downwardly through openings 34 to drop from the discharge end thereof in discrete portions in much the same manner as the material to be encapsulated discharges from conduit 16 of Fig. 1. After the material to be encapsulated has become enveloped in the encapsulating medium by impinging on film 40a, the resulting capsule falls into the hardening bath in vessel 60 wherein the encapsulating medium is converted into a more or less tough capsule around the material encapsulated.

After the capsules are removed from the hardening bath, they can be washed free from excess hardening medium by passing through a rinse or spray, such as water, for a short period of time, say 5 to 15 seconds.

In accordance with one aspect of this invention, it has been found that an aqueous solution of a water-soluble derivative of an alginic acid can be employed as the encapsulating medium. Preferably such derivative is an alkali metal salt, such as the sodium, potassium or lithium salts of alginic acid, although other water soluble salts such as the ammonium salt can be employed. The selected alginic acid derivative is dissolved in sufficient softened water at room temperature to render the same fluid to the extent that the solution will have sufficient viscosity and surface tension to readily form the desired film across the mouth of the annular discharge opening of the apparatus described hereabove. A two percent by weight sodium alginate solution has been found suitable for this purpose. If the sodium alginate does not disperse uniformly in the water, the resulting solution should be strained through a suitable screen.

When such alginate solutions are employed to encapsulate an oil-in-water emulsion, the water component of such emulsion is preferably likewise an alginate solution, say one and one-half weight percent solution thereof.

The capsule forming medium should be free from inclusions of gaseous material which would eventually form inclusions in the wall of the capsule product so that the wall of the capsule would be weakened at such point. In accordance with one aspect of this invention, it has been found that insoluble gases, such as air, which normally occur in the interstices of the granular material to be dissolved to form the capsule-forming medium, can be removed therefrom by displacement with a gas which is soluble in the solvent for the capsule-forming material. Thus, it has been found that air in the voids of sodium alginate, for example, can be displaced with a water-soluble gas such as carbon dioxide. Then, when the resulting carbon dioxide-containing alginate is dissolved in water, the carbon dioxide will likewise dissolve in the water with the result that the final liquid solution is free from any gaseous inclusions.

The hardening bath of this invention can be any bath which is capable of converting the capsule-forming medium into a hardened film. Thus, when a water-soluble alginic acid derivative is being employed, it is preferred to employ an aqueous solution of an alkaline earth metal salt such as calcium chloride, calcium bromide, strontium chloride, barium chloride, and the like. Thence, when the soft capsules of sodium alginate drop into such bath, the alkaline earth metal compound reacts with the alginate to form a water-insoluble alkaline earth metal salt of the alginate which is in the form of a tough, hard film. Preferably, the hardening bath contains sufficient of the selected alkaline earth metal salt, or mixtures thereof, to be near saturation in order that the hardening action of the bath can proceed at a rapid rate.

The hardened capsules of insoluble alginic acid derivative can be plasticized to form a capsule of increased flexibility by treating such capsules with a plasticizing agent such as glycerin. Preferably, it is applied as an aqueous solution having a concentration of glycerin within the range of about 2 to 10 percent by weight and then the water permitted to evaporate. The use of such plasticizer will reduce the loss of encapsulated material through the walls of the capsules.

After application of the plasticizer, the resulting capsules can be dried by any suitable means such as in an air dryer.

The materials which can be encapsulated in accordance with this invention can be any material capable of being discharged through a conduit or other discharge means such as conduits 16 and 34 in Figs. 1 and 7 respectively in the form of discrete portions. Thus, solid media can be encapsulated as well as liquid media. In accordance with one aspect of this invention, it has been found that viscous media are particularly adapted to be encapsulated in the apparatus of this invention. Thus, for example, it has been found that an oil-in-water emulsion, such as an emulsion of a liquid hydrocarbon such as gasoline in a water solution of alginate, such as a one-half to two weight percent solution thereof, can be readily encapsulated in an alginic acid derivative encapsulating medium. When encapsulating an emulsion, the meniscus 65 of Fig. 2 will be continuous with the wall of film 22 inasmuch as the continuous phase of the emulsion is the same as the encapsulating medium. Hence, the surface tension in the meniscus 65 is the strongest force at the necking down point 24. This causes the capsule to be closed at the surface of the emulsion. All of the emulsion is thus enclosed in a capsule and none of it is left inside of the reformed film of encapsulating medium. When the emulsion of hydrocarbon in alginate solution is encapsulated and the resulting capsules exposed to a hardening bath, not only can the capsule be hardened but also the continuous phase of the emulsion so that the resultant product is a capsule containing a hardened mass of material throughout which the hydrocarbon is dispersed. The material encapsulated is in the form of a cellular structure having the hydrocarbon contained in the cells and having the cell walls integral with the capsule wall.

In further accordance with this invention, it has been found that a material to be encapsulated which is partially or even completely miscible with the encapsulating medium can be readily encapsulated therein by forming a substantially impervious membrane between the material being encapsulated and the encapsulating medium immediately after or at the time the material to be encapsulated is dropped into contact with the encapsulating medium. For example, when water-soluble material or aqueous solutions of materials are the materials to be encapsulated in an aqueous encapsulating medium, a small amount of a material capable of hardening the encapsulating medium, such as calcium chloride, can be incorporated into the material being encapsulated. Then when this material contacts the film of encapsulating medium, the hardening material will react with the encapsulating medium to form a membrane between the capsule film and the material contained therein. In further example, an oily insecticide liquid which contains a water-solubilizing or dispersing agent can be encapsulated in an aqueous encapsulating medium by incorporating therein an ingredient, such as calcium chloride, capable of reacting with a component of the encapsulating film, such as sodium alginate, to form a membrane between the insecticide and the capsule film.

When a highly volatile liquid such as gasoline or pentane is encapsulated, there may be difficulty with the capsule becoming inflated. Air diffuses into the capsule and adds its partial pressure to that of the gasoline, and if the combined partial pressure is greater than atmospheric plus the tension in the capsule, the capsule will gradually become inflated. To minimize this difficulty, the liquid is de-aerated just previous to capsulating it. Then before enough air diffuses into the inside of the capsule to cause an excessive gas pressure therein, the capsule has had time to dry, and is then in better condition to prevent inflation. The de-aeration of the liquid serves two purposes; one, it provides a reservoir for the solution of the first increments of air that diffuse in, and second, it makes possible the solution of any small bubble left by the pelletizing nozzle, which if left undissolved would become the starting point of an inflating process as described above.

The liquids which can be encapsulated in accordance with this invention are of many types and physical properties. The liquid to be encapsulated should have a ratio of interfacial tension, against water and expressed in dynes/cm., to specific gravity greater than 14:1, preferably greater than 17:1, when the encapsulating medium is essentially aqueous as in the preferred 2.0 percent aqueous alginate solutions of this invention.

As stated above, solid materials can be encapsulated in accordance with this invention. Powdered or pulverulent materials are especially successfully encapsulated. Thus, such materials as powdered pharmaceuticals including quinine sulfate and penicillin have been successfully encapsulated. Materials such as quinine sulfate can be dissolved in oil or other solvent before encapsulation to aid in their digestion. When pharmaceuticals are encapsulated in an alginate, it is preferred that a substance such as albumine (and sugar) be incorporated into the alginate to facilitate dissolution of the capsule by gastric juices.

From the foregoing it will be seen that this invention is one well adapted to attain all of the ends and objects hereinabove set forth together with other advantages which are obvious and which are inherent to the structure, process, and composition.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The process of encapsulating a material which comprises the steps of suspending a film of capsule-forming medium by its peripheral edges and impinging a free falling discrete portion of said material to be encapsulated on said film with a force sufficient to cause a portion of said film to encapsulate said discrete portion and to sever the capsule from said film.

2. The process of encapsulating a material which comprises passing a capsule-forming material through an annular orifice and impinging a free falling discrete portion of said material to be encapsulated on the resulting film of capsule-forming material existing across said orifice.

3. The process of encapsulating a material which comprises forming a film of a capsule-forming material, dropping the material to be encapsulated thereon and maintaining a pneumatic pressure on said film on the same side thereof as said material is dropped of a magnitude sufficient that with the added force caused by dropping said material to be encapsulated on said film, the latter detaches from its support and forms a capsule-wall around the material to be encapsulated.

4. A process of encapsulating a viscous material which comprises passing a capsule-forming medium through an annular orifice at such a rate and in such a manner that a film is formed thereacross, dropping a free falling discrete portion of said material onto said film, maintaining sufficient pneumatic pressure on the upper side of said film to cause it to distend and to become detached from said orifice when said portion drops thereon but insufficient to detach said film without the added force of said mass, and passing the resulting capsule into a hardening bath for said capsule-forming medium.

5. The process of claim 4 wherein said material is dropped a distance sufficient that the impact of said material against said film will cause said material to assume a more spherical shape.

6. The process of claim 4 wherein said viscous material is an emulsion and wherein said capsule-forming medium is dissolved in a solvent of a similar nature to the continuous phase of said emulsion.

7. The process of claim 6 wherein said emulsion is oil emulsified in a water solution of an alginate and said medium is an aqueous solution of an alginate and wherein said hardening bath is an aqueous solution of a salt containing a cation capable of reacting with said alginate to render it water-insoluble.

8. The process of claim 7 wherein said salt is a water-soluble alkaline earth metal salt.

9. An apparatus for encapsulating a material in an encapsulating medium which comprises, in combination, means for discharging said medium as an annular film, said discharge means being adapted to permit said medium to form a transverse film suspended at its periphery by said discharge means, and means for discharging discontinuous portions of said material onto said film, the last said means being removed from said film a distance greater than the largest dimension of the discharged discontinuous portion of said material to permit said discharge material to pass as a free falling body before impinging on said film.

10. The apparatus of claim 9 in combination with a means for supplying a pneumatic pressure to said film on the same side as said material is impinged.

11. An apparatus for encapsulating a material in an encapsulating medium which comprises, in combination, a pair of concentric conduits forming an annular orifice at one end thereof, said orifice being so formed that said medium can form a film across the end of the inner one of said conduits, discharge means spaced above said orifice and internally of said inner conduit to permit material discharged intermittently therefrom to fall onto successive films formed across said orifice said vertical spacing being such as to allow the discharged material to fall freely through space before reaching the film and means for supplying a pneumatic pressure internally of said inner conduit.

12. An apparatus for encapsulating a material in an encapsulating medium which comprises, in combination, a first plate having an opening therein, a second plate also having an opening therein coaxial with the opening in said first plate and of smaller cross-sectional area, and a conduit having a greater diameter than the largest dimension of said opening in the second plate depending from said second plate around said opening and extending into the opening in said first plate to form an annular orifice therewith.

13. The apparatus of claim 12 in combination with means for supplying a pneumatic pressure internally of said conduit.

14. The apparatus of claim 13 in combination with a vessel adapted to contain a liquid and situated to receive a capsule from said orifice, a vertical baffle disposed in said vessel at a point laterally adjacent the point of entry of said capsule and having a portion located just below the level of the liquid in the vessel so that droplets of liquid splashed by said capsule falling therein will follow a path having a lateral component.

15. The method of encapsulating a liquid which contains a constituent miscible with the fluid encapsulating medium in which said liquid is to be encapsulated, which comprises adding a reagent to said liquid capable of reacting with said medium to form an insoluble membrane between said liquid and said fluid encapsulating medium and then encapsulating said liquid within an envelope of said medium.

16. The method of claim 15 wherein said constituent is water-soluble, said encapsulating medium is an aqueous solution of a water-soluble alginic acid derivative and said reagent is a water-soluble salt of an alkaline earth metal.

17. The method of claim 15 wherein said constituent is a petroleum base insecticide containing a solubilizing agent to render it at least partially soluble in water.

18. The method of claim 17 wherein said encapsulating medium is an aqueous solution of a soluble alginic acid derivative and said reagent is a soluble salt of an alkaline earth metal.

19. The process of encapsulating a material which comprises passing a capsule-forming medium through an annular orifice and impinging a free falling discrete portion of said material to be encapsulated on the resulting film of capsule-forming material existing across said orifice with a force sufficient to form a capsule of the capsule-forming medium about said discrete portion.

20. An apparatus for encapsulating a material in an encapsulating medium which comprises, in combination, a first vessel for receiving the encapsulating medium having a bottom plate with an opening therein, a second vessel for receiving the material to be encapsulated arranged above the first vessel and having an opening in its bottom plate coaxial with and of smaller cross-sectional area than the opening in the first vessel, and a conduit having a greater diameter than the largest dimension of said opening in the second vessel depending from said second vessel around said opening and extending into the opening in said first plate to form an annular orifice therewith.

References Cited in the file of this patent

UNITED STATES PATENTS

| | | |
|---|---|---|
| 1,046,056 | Drake | Dec. 3, 1912 |
| 1,066,852 | Siefert-Schwab | July 8, 1913 |
| 1,134,156 | Planten | Apr. 6, 1915 |
| 2,030,566 | Bonniksen | Feb. 11, 1936 |
| 2,275,154 | Merrill et al. | Mar. 3, 1942 |
| 2,289,668 | Mallory | July 14, 1942 |
| 2,306,265 | Heald | Dec. 22, 1942 |
| 2,331,572 | Scherer | Oct. 12, 1943 |
| 2,379,646 | Mueller | July 3, 1945 |
| 2,379,816 | Mabbs | July 3, 1945 |
| 2,379,817 | Mabbs | July 3, 1945 |